United States Patent
Louis et al.

(10) Patent No.: US 10,884,015 B2
(45) Date of Patent: Jan. 5, 2021

(54) MULTIDIRECTIONAL AIRSPEED DETECTION SYSTEM

(71) Applicant: Bell Helicopter Textron Inc., Fort Worth, TX (US)

(72) Inventors: Andrew Vincent Louis, Fort Worth, TX (US); Daniel Bryan Robertson, Southlake, TX (US); Matthew Edward Louis, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 0 days.

(21) Appl. No.: 16/400,916

(22) Filed: May 1, 2019

(65) Prior Publication Data

US 2020/0348332 A1    Nov. 5, 2020

(51) Int. Cl.
*G01P 5/165* (2006.01)
*G01F 1/46* (2006.01)

(52) U.S. Cl.
CPC ............... *G01P 5/165* (2013.01); *G01F 1/46* (2013.01)

(58) Field of Classification Search
None
See application file for complete search history.

(56) References Cited

U.S. PATENT DOCUMENTS

| | | | |
|---|---|---|---|
| 2,645,123 A | 7/1953 | Hundstad | |
| 2,701,474 A | 2/1955 | Goudy | |
| 2,789,433 A * | 4/1957 | Goudy | G01P 5/16 73/861.65 |
| 2,876,640 A | 3/1959 | Beach, Jr. et al. | |
| 2,923,152 A | 2/1960 | Mabry, Jr. et al. | |
| 3,034,353 A | 5/1962 | Anderson | |
| 3,244,001 A | 4/1966 | Pettingall | |
| 3,318,146 A * | 5/1967 | Hagen | G01L 15/00 73/180 |
| 3,449,954 A * | 6/1969 | Brown | G01F 1/42 73/861.65 |
| 3,673,866 A * | 7/1972 | Alperovich | G01L 19/0007 73/861.65 |
| 4,297,900 A * | 11/1981 | Brandt, Jr. | G01P 5/165 73/861.66 |
| 4,372,171 A * | 2/1983 | Brandt, Jr. | G01F 1/46 73/861.61 |
| 4,836,019 A * | 6/1989 | Hagen | G01P 5/165 73/180 |
| 4,838,087 A | 6/1989 | Nishiyama et al. | |
| 4,920,808 A | 5/1990 | Sommer | |
| 5,069,073 A | 12/1991 | Barrett | |
| 5,402,687 A | 4/1995 | Brandt, Jr. | |

(Continued)

FOREIGN PATENT DOCUMENTS

GB    2379026 A    2/2003

OTHER PUBLICATIONS www.aeroprobe.com/omniprobe/; Aeroprobe Revolutionary Technology 2018; Retrieved May 1, 2019.

*Primary Examiner* — Harshad R Patel
(74) *Attorney, Agent, or Firm* — Lightfoot & Alford PLLC (57) ABSTRACT

A pitot-static array system for a tail-sitting aircraft has a disk with a plurality of edge ports arrayed about an edge of the disk. Each of a plurality of pressure transducers is configured to measure air pressure at one of the edge ports. The edge ports are arrayed about an axis parallel to a pitch axis of the aircraft.

20 Claims, 8 Drawing Sheets

(56) References Cited

U.S. PATENT DOCUMENTS

| | | | | |
|---|---|---|---|---|
| 5,442,958 A * | 8/1995 | Hagen | ................... | G01P 5/165 |
| | | | | 73/170.02 |
| 5,585,557 A * | 12/1996 | Loschke | ................... | G01P 5/14 |
| | | | | 73/170.14 |
| 5,736,651 A * | 4/1998 | Bowers | ................... | G01F 1/46 |
| | | | | 73/861.66 |
| 6,543,298 B2 * | 4/2003 | Cronin | ................... | B64D 43/02 |
| | | | | 374/E13.006 |
| 6,557,423 B1 | 5/2003 | Vozhdaev et al. | | |
| 6,564,651 B1 * | 5/2003 | Bowers | ................... | G01F 1/46 |
| | | | | 73/861.66 |
| 6,928,884 B1 * | 8/2005 | Pearson | ................... | G01F 1/46 |
| | | | | 73/861.42 |
| 8,342,036 B2 | 1/2013 | Khimji | | |
| 8,739,638 B1 * | 6/2014 | England | ................... | G01F 1/40 |
| | | | | 73/861.52 |
| 10,073,112 B2 | 9/2018 | Golovkin et al. | | |
| 10,324,104 B2 * | 6/2019 | Ashmore | ............... | G01P 13/025 |
| 2011/0094311 A1 * | 4/2011 | Khimji | ................... | G01P 5/165 |
| | | | | 73/861.65 |
| 2012/0144931 A1 | 6/2012 | Michel | | |
| 2014/0020479 A1 * | 1/2014 | Barbou | ................... | G01P 5/16 |
| | | | | 73/861.65 |
| 2014/0130608 A1 * | 5/2014 | Adams | ................... | G01P 5/165 |
| | | | | 73/861.66 |
| 2014/0290383 A1 * | 10/2014 | Ashton | ................... | G01P 5/165 |
| | | | | 73/861.65 |
| 2018/0045751 A1 | 2/2018 | Kearney et al. | | |

\* cited by examiner

FIG. 11

MULTIDIRECTIONAL AIRSPEED DETECTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventional pitot-static elements are configured to measure airspeed and airspeed related parameters by measuring a ram air pressure and a static air pressure with a pitot-static tube. Error can be introduced into the parameters if the pitot-static tube is misaligned with the ram air flow. Pitot-static tubes featuring gimbaled heads can help reduce error due to misalignment, but they have limitations regarding how many degrees the gimbaled heads can pivot. Conventional pitot-static tubes are generally limited to ±25 degrees of misalignment.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes a multidirectional airspeed detection system configured to measure flight parameters of an aircraft, and the system may be especially useful for a tail-sitting aircraft that pitches over to wing-borne flight. The system has a pitot tube array, which is fixedly mounted to the aircraft, and the array has a plurality of edge ports. Each of a plurality of pressure transducers is in fluid communication with an edge port for measuring air pressure at each edge port. A computer, which may be integrated within the array or carried elsewhere on the aircraft, is configured to receive outputs from the transducers for use in calculating the flight parameters. Additionally or alternatively, data from the array may be communicated to an onboard or remote flight control system (FCS).

Figure 1:
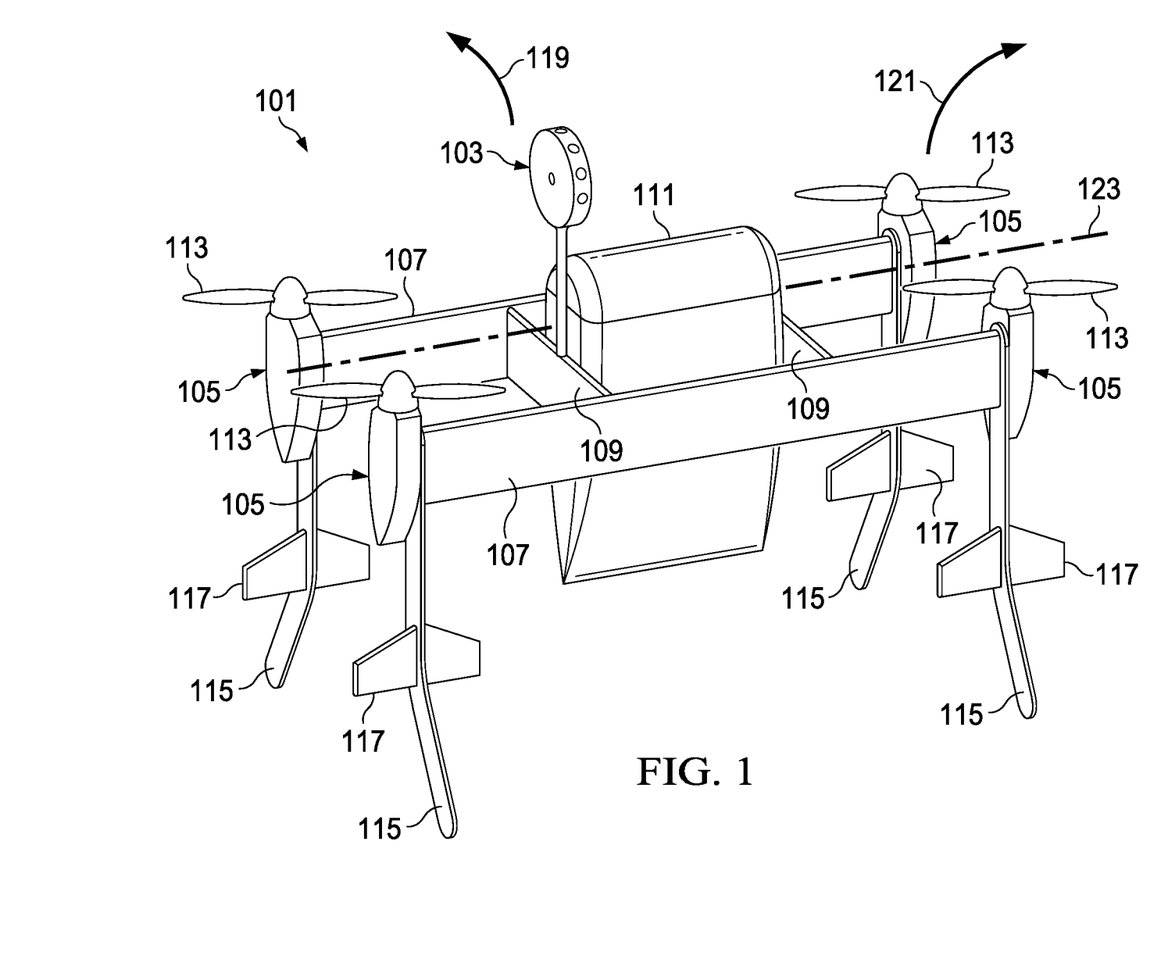
FIG. 1 is an oblique view of a rotorcraft incorporating a pitot-static array according to this disclosure.

FIG. 1 illustrates a tail-sitting aircraft 101 equipped with a pitot-static array 103 according to this disclosure. Aircraft 101 comprises thrust modules 105, spars 107, pylons 109, and wing 111. Each thrust module 105 comprises a rotor 113, a stabilizer 115, and a control surface 117. Rotors 113 cooperate to generate enough thrust to lift aircraft 101 until aircraft 101 is experiencing wing-borne flight. As illustrated, wing 111 is a symmetrical airfoil capable of producing lift regardless of the orientation of aircraft 101 in wing-borne flight. Therefore, after takeoff aircraft 101 can pitch in generally a first direction 119 or a second direction 121 about pitch axis 123 to convert to wing-borne flight. Alternatively, wing 111 is asymmetrical and configured to provide lift in only one direction, thereby limiting aircraft 101 to a single direction for conversion.

Figure 2:
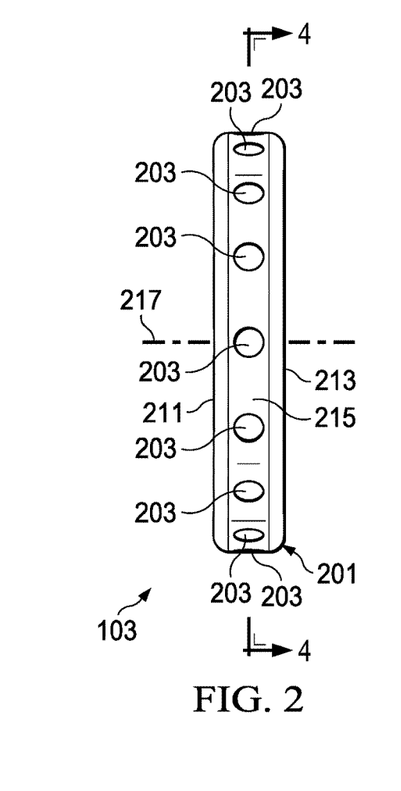
FIG. 2 is a top view of the pitot-static array of FIG. 1.
Figure 3:
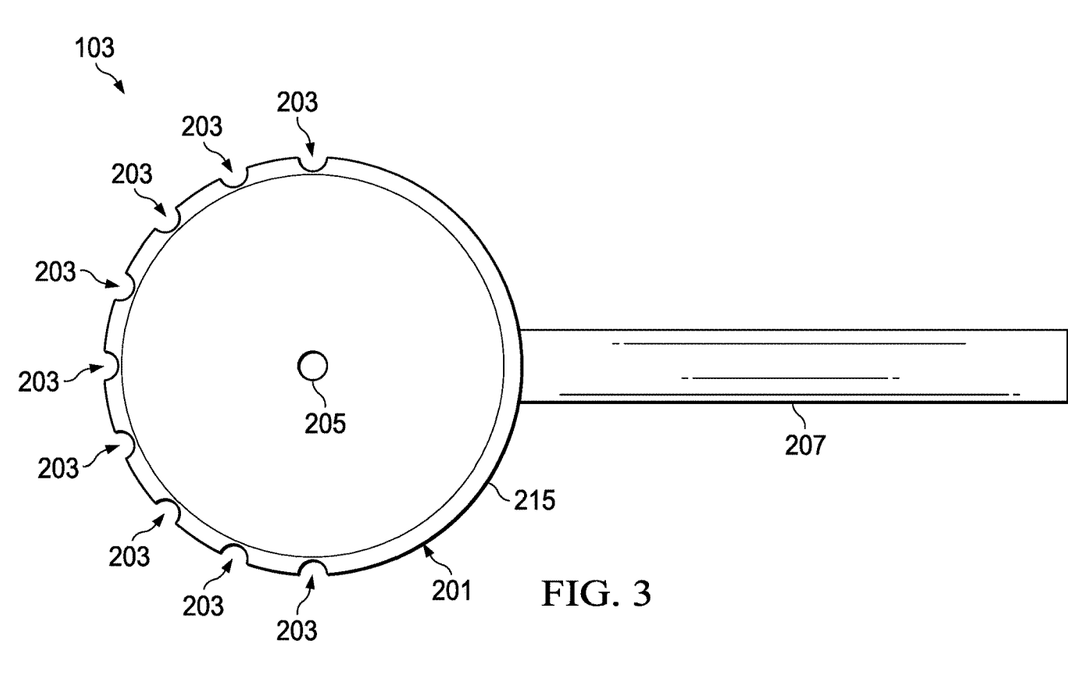
FIG. 3 is a side view of the pitot-static array of FIG. 1.
Figure 4:
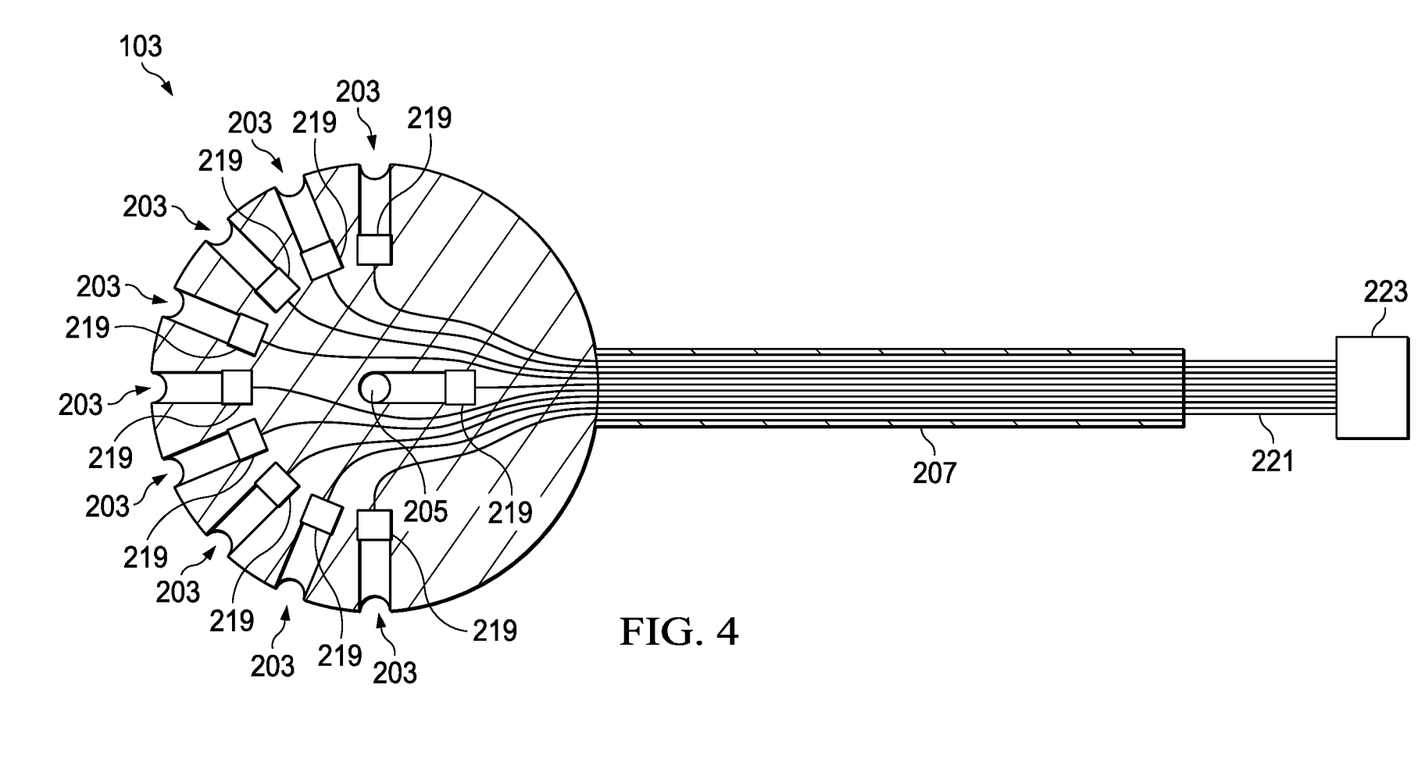
FIG. 4 is a cross-sectional side view of the pitot-static array of FIG. 1.

FIGS. 2 through 4 illustrate details of pitot-static array 103. Array 103 comprises disk 201, a plurality of edge ports 203, side port 205, and a spacing element, such as pole 207. Disk 201 comprises first circular surface 211, second circular surface 213, and edge surface 215 connecting first circular surface 211 to second circular surface 213. Interfaces between edge surface 215 and surfaces 211, 213 are preferably radiused for aerodynamic performance. Edge ports 203 are evenly spaced around a forward half of disk 201 opposite pole 207 and are arrayed about axis 217. As illustrated, array 103 is configured for a tail-sitting aircraft that takes off vertically and rotates about pitch axis 123 into wing-borne flight. Nine edge ports 203 are illustrated, but more or fewer edge ports 203 can be provided. Side port 205 is centered about axis 217, which is parallel to pitch axis 123 of aircraft 101, in second circular surface 213. Ports 203, 205 are preferably flush with surfaces 211, 213, 215.

Referring specifically to FIG. 4, a plurality of pressure transducers 219 are carried within disk 201 and configured to measure pressure of ports 203, 205. Each of ports 203, 205 is in fluid communication with at least one of transducers 219, though each port 203, 205 is preferably coupled directly to a single transducer 219. Alternatively, multiple ports 203, 205 are selectively coupled to a single transducer 219 through a series of valves. Electrical outputs from transducers 219 are communicated via wires 221 through pole 207 to an electronic device 223, which may be a signal conditioner, an analog-digital converter, or a computer. Alternatively, one or more of devices 223 can be located inside disk 201, and the outputs can be communicated to one or more remote devices.

Figure 5:
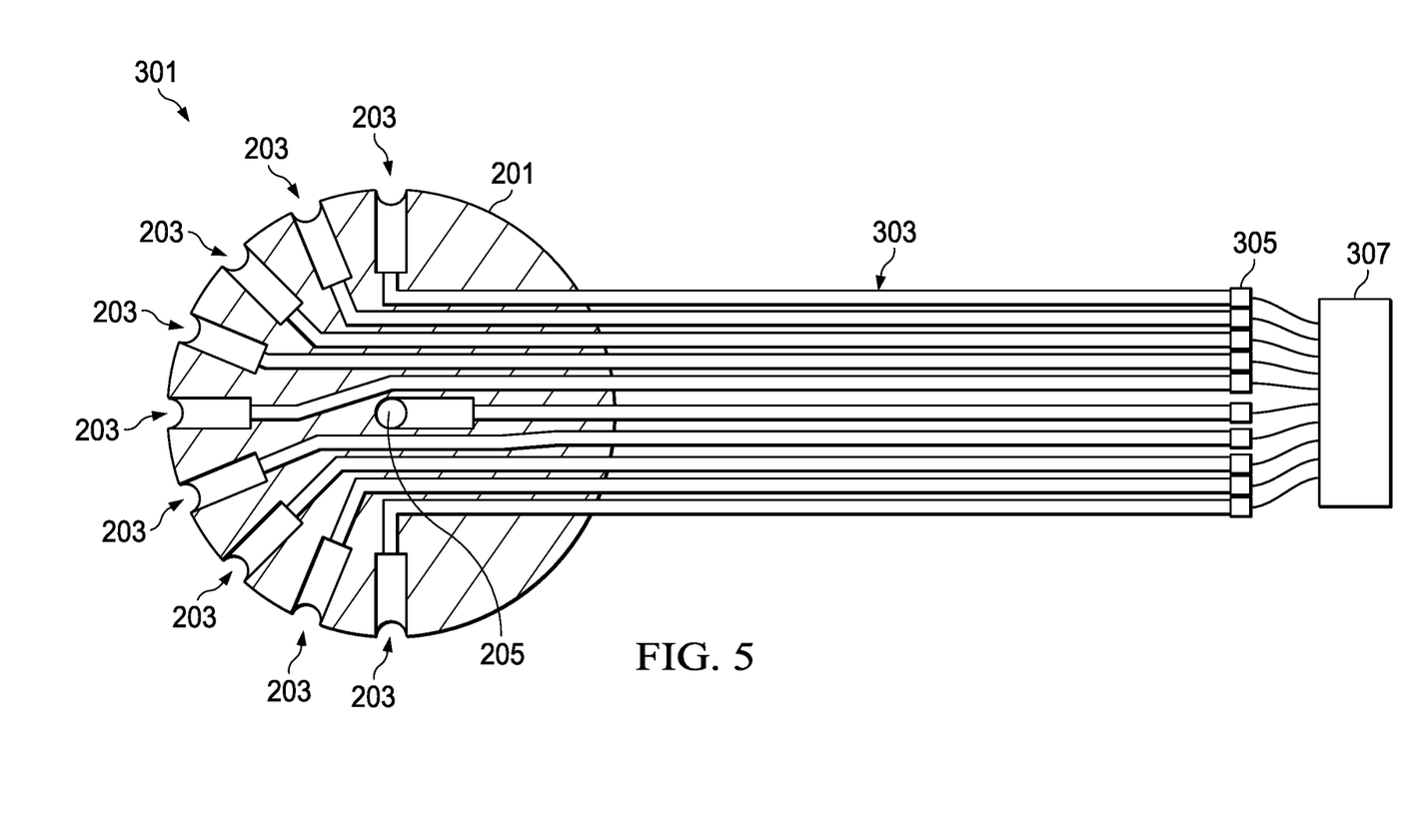
FIG. 5 is a cross-sectional view of another embodiment of a pitot-static array according to this disclosure.

FIG. 5 illustrates another embodiment of a pitot-static array according to this disclosure. Pitot-static array 301 comprises the same elements as array 103 but comprises tubing 303 from ports 203, 205 for communicating air pressure to remote transducers 305. Outputs from transducers 305 are then communicated to a remote device 307, which may be a signal conditioner, an analog-digital converter, or a computer. This configuration has fewer internal components within disk 201 and may allow disk 201 to be smaller than in array 103.

Figure 6:
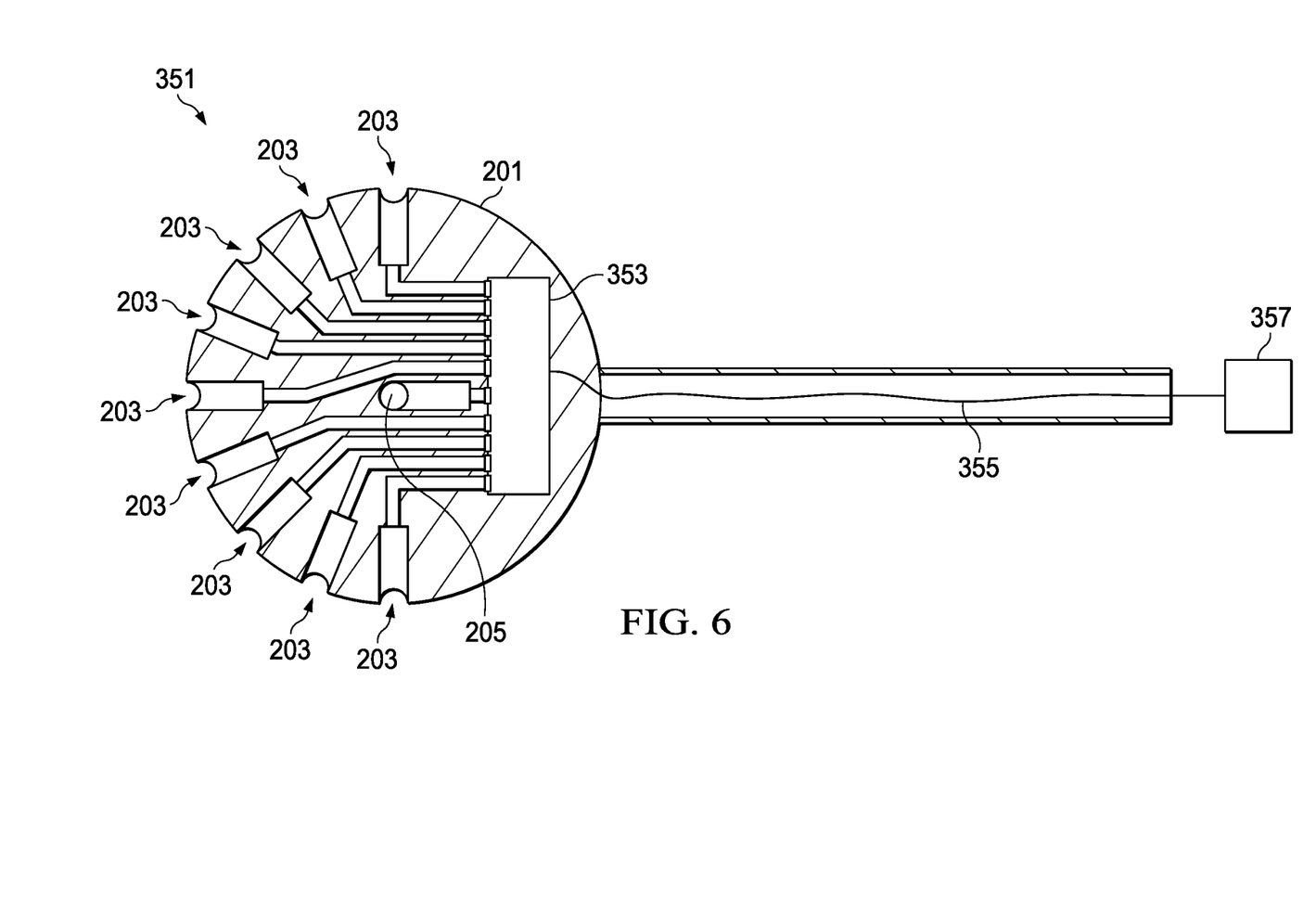
FIG. 6 is a cross-sectional view of another embodiment of a pitot-static array according to this disclosure.

FIG. 6 illustrates another embodiment of a pitot-static array according to this disclosure. Pitot-static array 351 comprises the same elements as array 103 but also features a processor 353 located inside disk 201. Processor 353 is preferably a combination of pressure transducers, a signal conditioner, and an analog-digital converter. Processor 353 may also include a processor for providing the ability to read static pressure, determine airspeed and other parameters, and then output those parameters on cable 355 for use by FCS 357. This configuration enables array 351 to have a reduced response time compared to array 301 because of the reduced volume of air between edge ports 203 and processor 353.

Figure 7:
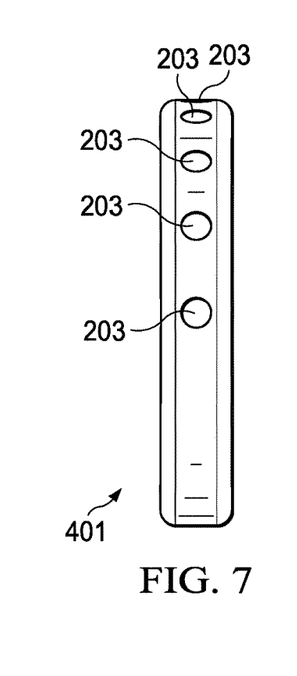
FIG. 7 is a top view of another embodiment of a pitot-static array according to this disclosure.
Figure 8:
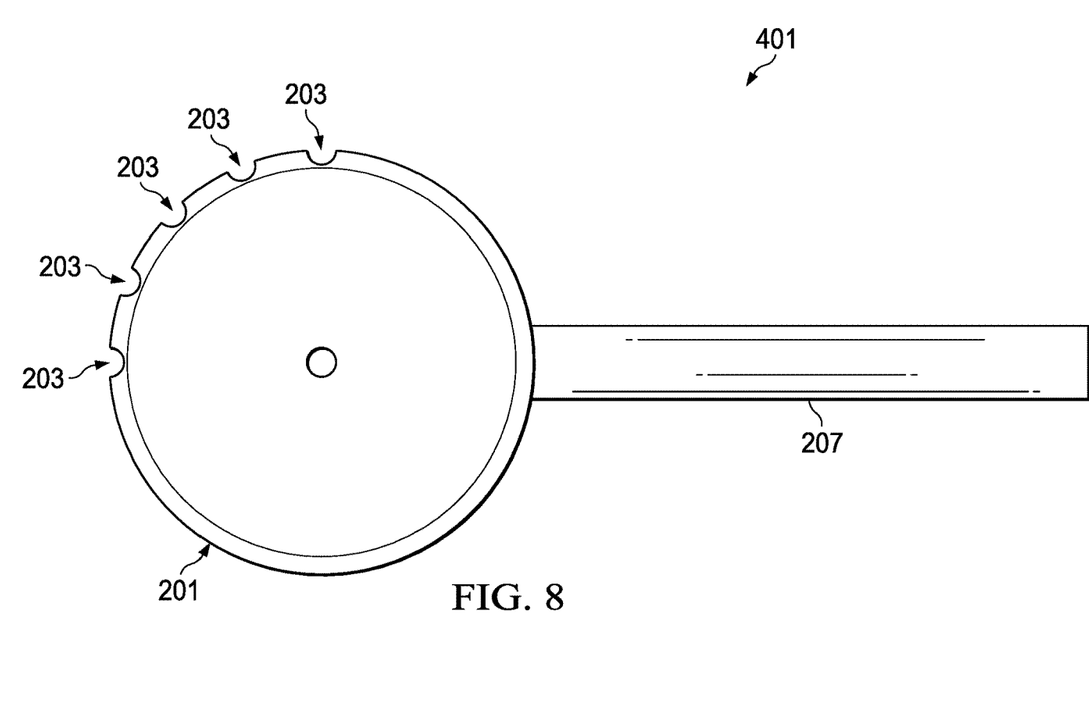
FIG. 8 is a side view of the pitot-static array of FIG. 7.

FIGS. 7 and 8 illustrate another embodiment of a pitot-static array according to this disclosure. Pitot-static array 401 comprises the same elements as array 103 but features only five edge ports 203 instead of nine edge ports 203, as used in array 103. Array 401 may be particularly useful for tail-sitting aircraft that take off vertically and rotate only one direction into wing-borne flight. Edge ports 203 of system 401 are evenly spaced around one-quarter of a forward portion of disk 201. Other spacing configurations are contemplated based upon the flight characteristics of the aircraft.

Figure 9:
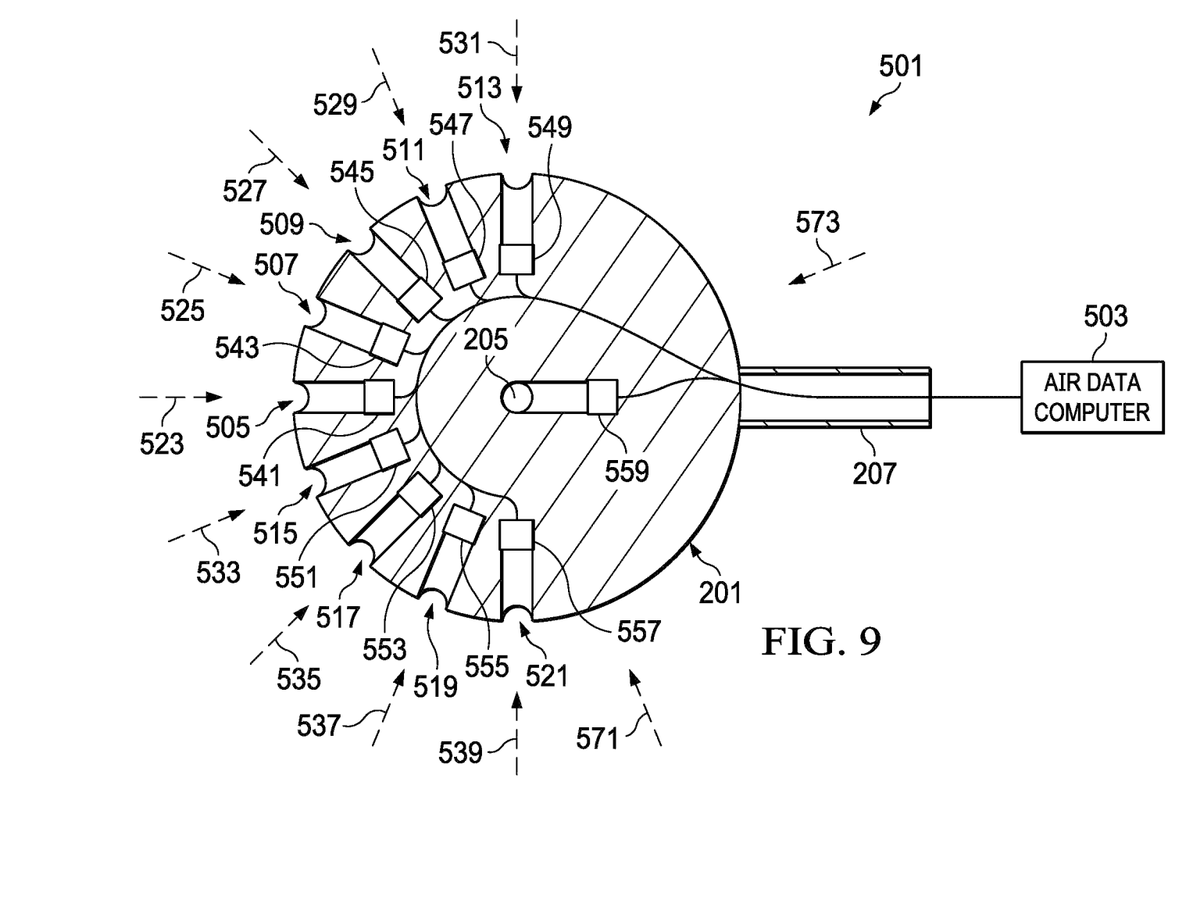
FIG. 9 is a schematic view of a pitot-static array according to this disclosure.

FIG. 9 illustrates a pitot-static system 501 according to this disclosure. System 501 comprises a disk 201, a side port 205, a pole 207, an air data computer 503, a first edge port 505, a second edge port 507, a third edge port 509, a fourth edge port 511, a fifth edge port 513, a sixth edge port 515, a seventh edge port 517, an eighth edge port 519, and a ninth edge port 521. First arrow 523 is aligned with first edge port 505. Second arrow 525 is aligned with second edge port 507. Third arrow 527 is aligned with third edge port 509. Fourth arrow 529 is aligned with fourth edge port 511. Fifth arrow 531 is aligned with fifth edge port 513. Sixth arrow 533 is aligned with sixth edge port 515. Seventh arrow 535 is aligned with seventh edge port 517. Eighth arrow 537 is aligned with eighth edge port 519. Ninth arrow 539 is aligned with ninth edge port 521.

System 501 further comprises a first transducer 541, a second transducer 543, a third transducer 545, a fourth transducer 547, a fifth transducer 549, a sixth transducer 551, a seventh transducer 553, an eighth transducer 555, a ninth transducer 557, and a tenth transducer 559. Transducers 541, 543, 545, 547, 549, 551, 553, 555, 557, 559 are typically static pressure sensors, however, in some embodiments, they can be dynamic pressure sensors.

Edge ports 505, 507, 509, 511, 513, 515, 517, 519, 521 are each in fluid communication with an associated transducer 541, 543, 545, 547, 549, 551, 553, 557, 559 such that air pressure detected by each transducer 541, 543, 545, 547, 549, 551, 553, 557, 559 increases as airflow increases generally a corresponding arrow 523, 525, 527, 529, 531, 533, 535, 537, 539. Side port 205 is in fluid communication with transducer 559, such that air pressure detected by transducer 559 increases as static air pressure increases generally adjacent disk 201.

Air data computer 503 is electrically coupled to transducers 541, 543, 545, 547, 549, 551, 553, 555, 557, 559 and can use outputs from transducers 541, 543, 545, 547, 549, 551, 553, 555, 557, 559 to determine airspeed, angle of attack, and sideslip throughout a full conversion corridor of tail-sitting aircraft 101. Each transducer 541, 543, 545, 547, 549, 551, 553, 555, 557, 559 is sampled concurrently to determine a magnitude and direction of a wind vector. A flight control computer, processor, or another signal conditioner might be used in place of air data computer 503. For example, an aircraft moving in direction 571 would likely detect a pressure in edge port 511 greater than all other edge ports because airflow along arrow 529 is greater than in other directions, whereas edge port 515 would likely have minimal or no pressure increase. Another example is if an aircraft moves in direction 573, then a pressure in edge port 515 will be greater than all other edge ports because airflow along arrow 533 is greater than in other directions.

Figure 10:
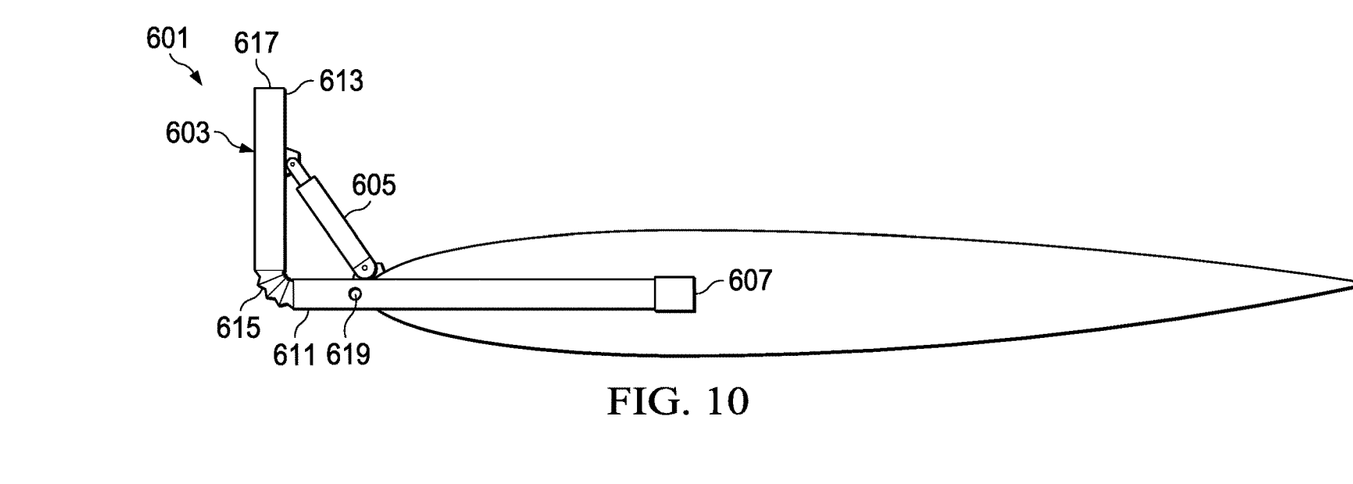
FIG. 10 is a side view of a pivotable pitot-static system according to this disclosure and configured in a first orientation.
Figure 11:
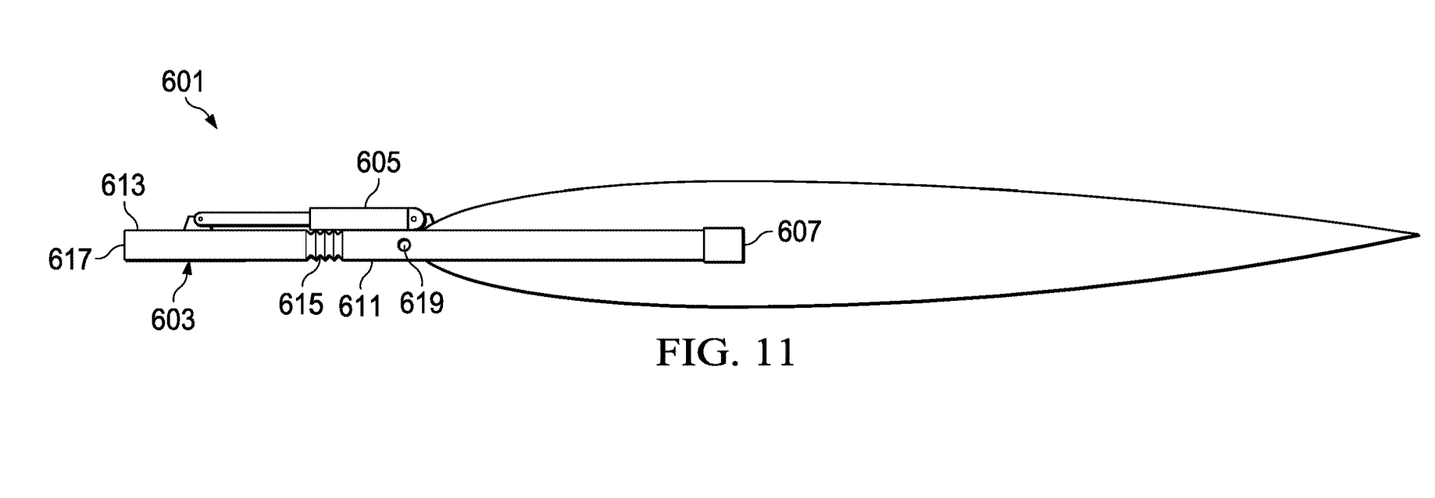
FIG. 11 is a side view of the system of FIG. 10 configured in a second orientation.

FIGS. 10 and 11 illustrate another embodiment of a pitot-static system according to this disclosure. Pitot-static system 601 comprises a tube 603, an actuator 605, and a pressure transducer 607. System 601 is configured to pivot tube 603 and maintain airflow into system 601 as aircraft 101 converts from generally vertical flight to wing-borne flight. Pitot-static tube 603 comprises a fixed portion 611, a pivoting portion 613, a flexible portion 615, a pitot opening 617, and a static opening 619. System 601 is configured for actuator 605 to pivot pivoting portion 613 generally 90 degrees from a vertical orientation, as illustrated in FIG. 10, to a horizontal orientation, as illustrated in FIG. 11. An alternative embodiment is configured to allow the system 601 to pivot generally 180 degrees for aircraft that pitch over in either direction.

For each embodiment, it should be noted that the side port for measuring static pressure can be optional, with static pressure being measured at one or more of the edge ports that are generally perpendicular to or pointed away from the direction of travel of the aircraft. As the aircraft pitches over in conversion to wing-borne flight, the particular edge port or ports used to measure static pressure will change based on the attitude of the aircraft. Alternatively, edge ports may be used when the system is unable to measure pressure at a side port, such as, for example, when a side-port pressure transducer is inoperative.

At least one embodiment is disklosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disklosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A pitot-static array system for a tail-sitting aircraft, the pitot-static array system comprising:
a disk having a plurality of edge ports arrayed about an edge of the disk; and
a plurality of pressure transducers, each transducer configured to measure air pressure at one of the edge ports;
wherein the edge ports are arrayed about an axis parallel to a pitch axis of the aircraft; and
wherein at least one of the edge ports is used as a ram pressure port;
wherein at least one of the edge ports is used as a static pressure port.

2. The system of claim 1, further comprising:
a processor configured to receive outputs from the transducers;
wherein the processor determines an airspeed of the aircraft from the outputs of the transducers.

3. The system of claim 1, further comprising:
a processor configured to receive outputs from the transducers;
wherein the processor determines an angle of attack of the aircraft from the outputs of the transducers.

4. The system of claim 1, further comprising:
a processor configured to receive outputs from the transducers;
wherein the processor determines a sideslip of the aircraft from the outputs of the transducers.

5. The system of claim 1, wherein the edge ports are arrayed around one-half of the edge of the disk.

6. The system of claim 1, wherein the edge ports are arrayed around one-quarter of the edge of the disk.

7. The system of claim 1, wherein the transducers are located inside the disk.

8. The system of claim 1, wherein the transducers are located external to the disk.

9. The system of claim 1, further comprising:
a signal conditioner;
wherein the pressure transducers are assembled with the signal conditioner located inside the disk.

10. The system of claim 1, further comprising:
a spacing element;
wherein the disk is carried by the spacing element for locating the disk a distance from components of the aircraft.

11. A pitot-static array system, comprising:
a disk having;
an array of edge ports aligned on an edge surface of the disk; and
a side port located on a circular surface of the disk; and
a plurality of pressure transducers configured to measure a ram air pressure of each edge port and a static air pressure of the side port;
wherein each port is in fluid communication with one of the pressure transducers.

12. The system of claim 11, further comprising:
a spacing element;
wherein the disk is carried by the spacing element.

13. The system of claim 11, further comprising:
a processor configured to receive outputs from the transducers;
wherein the processor determines an airspeed from the outputs of the transducers.

14. The system of claim 11, wherein the edge ports are arrayed around one-half of the edge surface of the disk.

15. The system of claim 11, wherein the edge ports are arrayed around one-quarter of the edge surface of the disk.

16. The system of claim 11, wherein the pressure transducers are located inside the disk.

17. The system of claim 11, further comprising:
a signal conditioner;
wherein the pressure transducers are assembled with the signal conditioner located inside the disk.

18. A pitot-static array system for an aircraft, the pitot-static array system comprising:
a disk having a plurality of edge ports arrayed about an edge of the disk;
a side port located on a side surface of the disk;
a plurality of pressure transducers, one of the plurality of transducers being configured to measure ram air pressure at each of the edge ports, and one of the plurality of transducers being configured to measure static air pressure at the side port;
wherein the edge ports are arrayed about an axis parallel to a pitch axis of the aircraft, and the side port is oriented as parallel to the pitch axis.

19. The system of claim 18, further comprising:
a processor configured to receive outputs from the transducers;
wherein the processor determines an airspeed of the aircraft from the outputs of the transducers.

20. The system of claim 18, further comprising:
a processor configured to receive outputs from the transducers;
wherein the processor determines an angle of attack of the aircraft from the outputs of the transducers.

* * * * *